No. 824,825. PATENTED JULY 3, 1906.
F. W. SCHMIDT.
HARVESTER.
APPLICATION FILED NOV. 27, 1905.
4 SHEETS—SHEET 1.
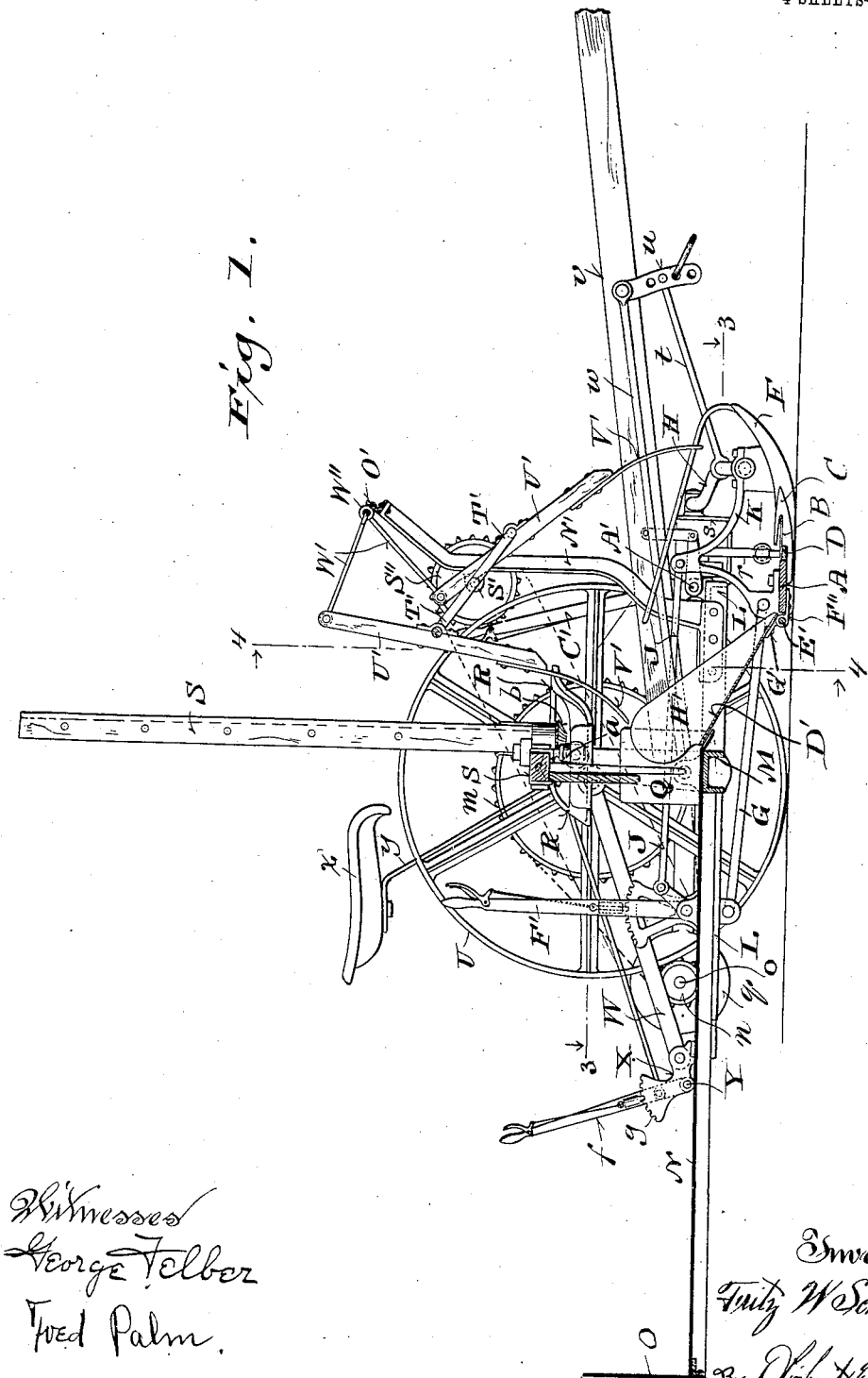
Witnesses
George Felber
Fred Palm.
Inventor
Fritz W Schmidt
By Oliphant & Young
Attorneys No. 824,825. PATENTED JULY 3, 1906.
F. W. SCHMIDT.
HARVESTER.
APPLICATION FILED NOV. 27, 1905.
4 SHEETS—SHEET 2.
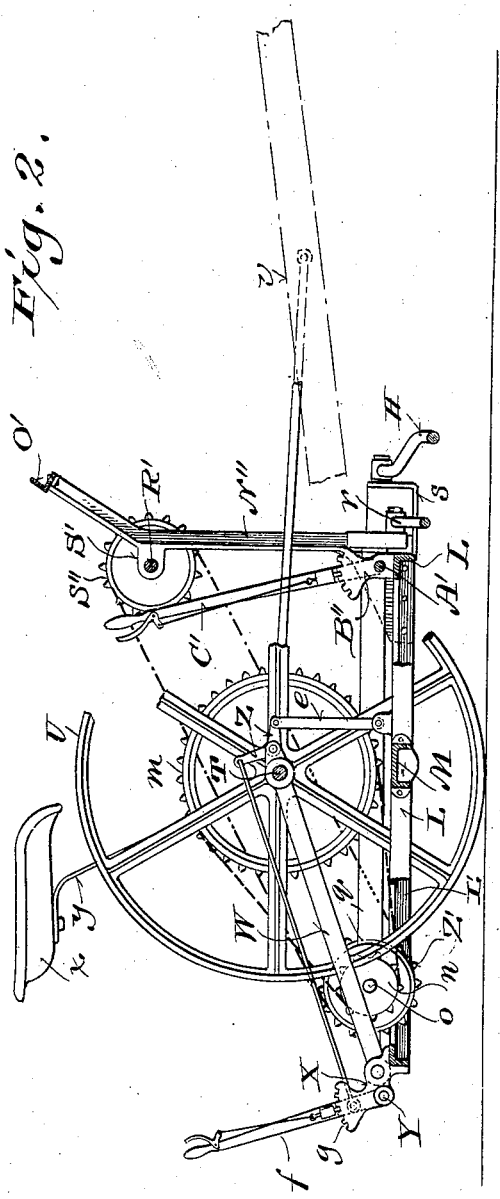

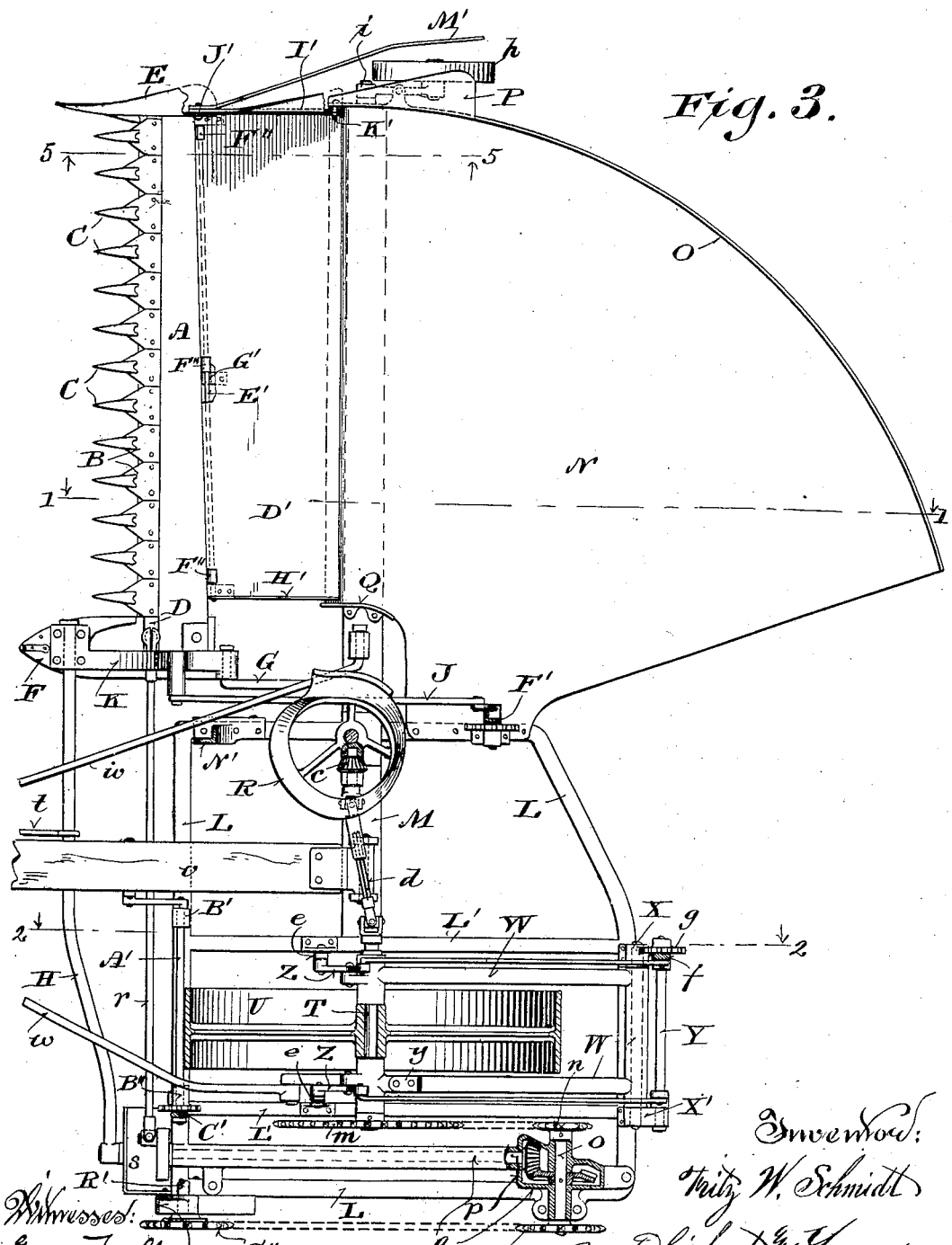

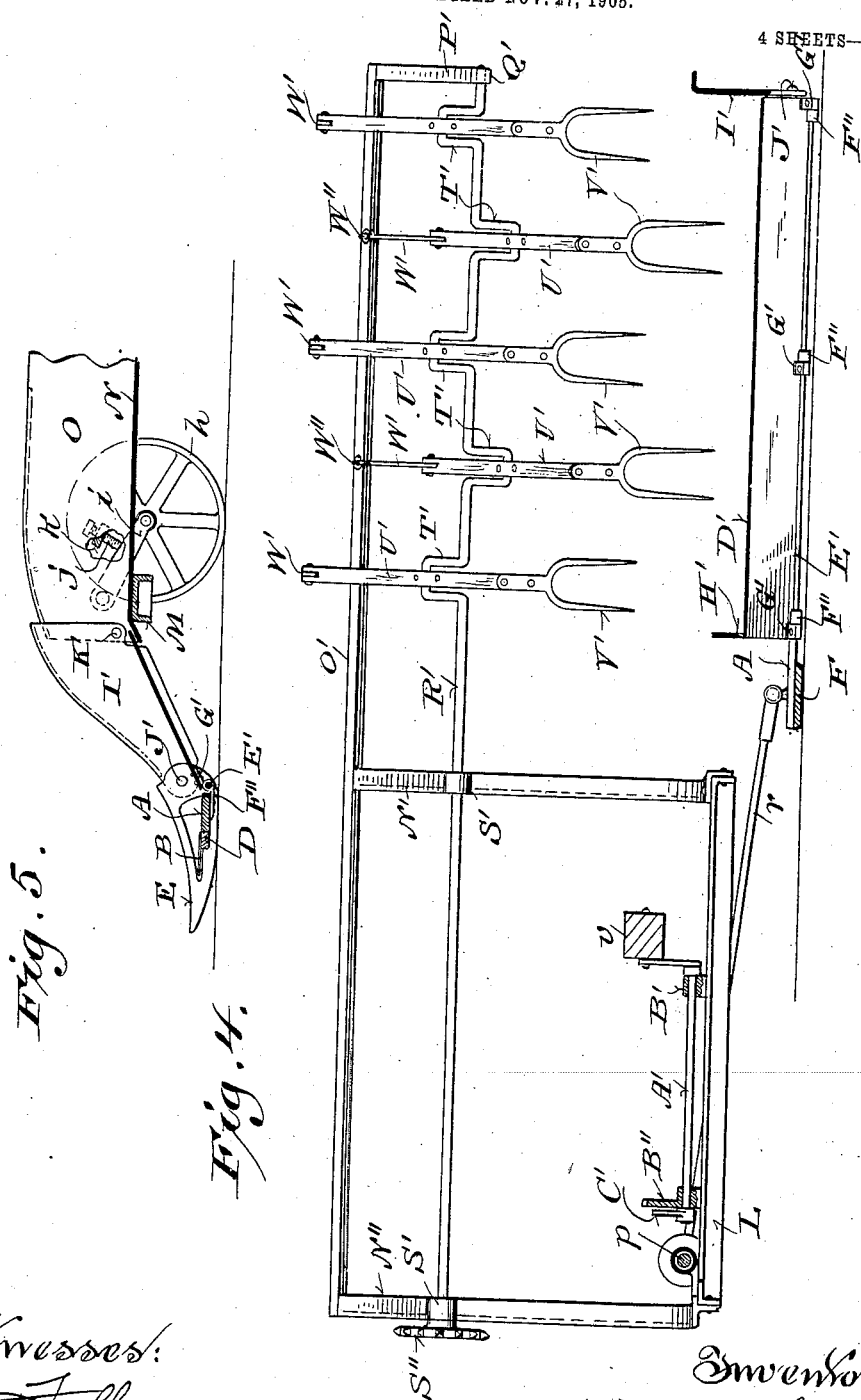

UNITED STATES PATENT OFFICE.

FRITZ W. SCHMIDT, OF NEW HOLSTEIN, WISCONSIN.

HARVESTER.

No. 824,825.         Specification of Letters Patent.         Patented July 3, 1906.

Application filed November 27, 1905. Serial No. 289,276.

*To all whom it may concern:*

Be it known that I, FRITZ W. SCHMIDT, a citizen of the United States, and a resident of New Holstein, in the county of Calumet and State of Wisconsin, have invented certain new and useful Improvements in Harvesters; and I do hereby declare that the following is a full, clear, and exact description thereof.

My invention relates to harvesting-machines, the particular object being to provide a harvester for pea-vines or the like which is capable of picking up the tangled vines and delivering them to the cutting-knives and thereafter deposit the cut vines in bunches beyond the path of travel of the harvester on its next cut.

Said invention consists in various details of construction and combination of parts, as fully set forth hereinafter with reference to the accompanying drawings and subsequently claimed.

In the drawings, Figure 1 represents a sectional elevation of a machine of the reaper type embodying the features of my invention, the section being taken looking from the grain side of the machine as indicated by line 1 1 of Fig. 3; Fig. 2, a similar section view taken on a plane as indicated by line 2 2 of Fig. 3; Fig. 3, a plan view of the machine with parts broken away and parts in section as indicated by line 3 3 of Fig. 1; Fig. 4, a detail sectional elevation of the same, said view being taken looking from the rear of the machine on a plane as indicated by line 4 4 of Fig. 1; and Fig. 5, a detail section on line 5 5 of Fig. 3.

My invention, as illustrated in a general way, embodies all the necessary mechanism of a machine of the reaper type in combination with a yielding delivery-table located between the reaper-platform and cutter-bar thereof, together with a series of driven tedder-forks which are designed to pick up the pea-vines and deliver the same to the knives to be cut and thereafter to the rakes.

Referring by letter to the drawings, A represents the cutter-bar of a reaper, B the knives, and C the guards, having a reciprocating knife-bar D arranged therein. The cutter-bar carries the usual divider E at its outer end and a shoe F at the inner end thereof. The shoe F is provided with a thrust-bar G, drag-bar H, and tilting lever I, linked to the aforesaid shoe by a rod J, the latter being pivoted in a bracket K, which is fast to the shoe. The tilting lever is pivoted in a segmental bracket secured to the main frame L of the machine, the function of said lever being to adjust the points of the guards with relation to depth of cut.

Extending from the main frame and parallel with the cutting apparatus is a sill M, which serves as a support for a grain-platform N, which latter upon its grain side is curved toward the stubble end of the machine, where it terminates, said side being provided with a wall O, which is bent over to form a spreader P at its front end. At the inner or stubble side of the platform N is secured a short upright curved guard Q, which, together with the wall O, serves as a throat through which the pea-vines are raked to the discharge end of the platform. For this purpose a cam rake-head R is secured to the sill M adjacent to the side guard Q, upon which is mounted a pair of rake-arms S. These arms carry the usual teeth and cam-rollers *a* and are revolved by the bevel-gears *b c*, and said rake-arms are driven by a knuckle-jointed shaft *d* from the axle T of the bull-wheel U and are so guided by the cam R that they will in their revolution fall to the platform and sweep the pea-vines clear of the latter into bunches. The rake movement just described, however, being common forms no part of my invention and so far as the detail for obtaining the result is concerned may be varied indefinitely.

As shown, the main frame L from front to rear is braced by rails L' L', between which is suspended the bull-wheel, its shaft T being mounted in a yoke W in pivotal connection with the rear of said main frame through brackets X X', extending therefrom. The said brackets X X' are also provided with bearings for a cranked shaft Y, which is linked to bell-cranks Z, pivoted to ears on the yoke W adjacent to the bull-wheel shaft T. The said bell-cranks Z are connected to ears on the main frame by straps *e*, which, through their several connections, regulate the elevations of said main frame at its stubble side, there being a locking-lever *f* fast on the crank-shaft Y for this purpose, which lever is held in its adjusted position by a detent *g*, extending from the bracket X aforesaid.

The machine at its grain side is supported by a wheel *h*, trunnioned in an arm *i*, which is pivoted to the wall O of the platform, adjustment of said wheel being obtained through a threaded stem $j$, projecting through a lug $k$ of the said wall O and adapted to engage the arm $i$ aforesaid.

Power is transmitted to the cutting apparatus from the bull-wheel by means of a sprocket-wheel $m$, fast on the shaft T thereof, the said wheel being in link-belt connection with a sprocket $n$, fast on a counter-shaft $o$ in bevel-gear connection with a pitman drive-shaft $p$, which shaft, together with shaft $o$ and said bevel-gears, are incased in a housing $q$, secured to the main frame. The pitman drive-shaft $p$ extends forward and is wristed to a pitman $r$, the opposite end of which is connected to the knife-bar D, whereby motion is imparted thereto. Where the pitman connects with the drive-shaft $p$ the usual housing $s$ is provided, the housing also serving as a means through which the drag-bar H is connected to the main frame. Said drag-bar is also connectd by a rod $t$ to the draft-link $u$ of the pole $v$, whereby side strain upon the cutting apparatus is corrected. The draft-pole $v$ is hinged to the sill M and braced by hounds $w$, pivoted thereto, the opposite end of one being pivoted to said sill, while the corresponding end of the other brace straddles the bull-wheel and is pivoted to a forward extension of the yoke W. Said yoke also serves as a support for a seat $x$, which is secured thereto through a spring-strap $y$, as shown.

A tilting adjustment of the machine-frame with relation to the draft-pole is obtained by means of a rock-shaft A', which is mounted in brackets B' B'', secured to the front rail of the main frame. The bracket B'' has a locking-segment for engagement with a latch-lever C'', secured to the rock-shaft A', the opposite end of said shaft being in crank connection with the pole.

All of the mechanisms detailed in the preceding description are for accomplishing the several well-known adjustments and driving means of any type of reaper and form no parts of my invention, except as far as they operate to produce a perfect machine, it being understood that I do not confine myself to the various details as hereinbefore set forth, but may without departing from the spirit of my invention employ any well-known type of machine to which my improvements may be attached.

By the foregoing description it will be seen that the floating cutting apparatus is entirely free from the frame of the machine, and hence is capable by its various adjustments and connections to rest upon the ground in operation and compensate itself to the contour thereof, thus making it possible for the guards, with the assistance of my attachments, to pick up the pea-vines close to the roots thereof and deliver the same to the knives under any condition. The said attachment primarily consists of an apron D', which is hinged to the cutter-bar A by means of a pivotal rod E' engaging hinge-leaves F'' G', respectively riveted to the front edge of the apron and rear edge of said cutter-bar. The apron inclines backward, its free end overlapping and resting upon the front ledge of the platform N, between the outer wall O of said platform and its inner guard Q, as best illustrated in Figs. 1 and 3. The inner side of said apron is bent up to form a guard H', which rests against the guard Q and serves as a continuation of the same. The grain side of the apron terminates adjacent to the divider E and said outer wall O of the platform, and abutting this side is a guard I', which is pivoted to said divider by a bolt J' and also pivoted to the lower portion of the wall O by a bolt K'. This guard not only serves to guide the pea-vines upon the platform, but also acts as a thrust-bar for the outer end of the cutting apparatus, and by reason of its pivoted connection in no way interferes with the free rise and fall of said apparatus. The upper edge of the guard I' is bent over to form a continuation of the spreader P, there being the usual grain-wheel spreader-bar M'. The latter, as shown, is secured to the divider E by the bolt J', which also confines the guard I' at this point, as stated. Bolted to the front of the main frame are standards N' N'', which serve as supports for an angle-bar O', secured thereto. Said bar overhangs the cutting apparatus and at its outer end carries a bracket P', which terminates in a bearing Q' for a shaft R'. The latter extends across the machine, having bearings S' in each of the standards, and upon its stubble end said shaft carries a sprocket S'', through which motion is imparted thereto. Directly over the cutting apparatus the shaft is provided with a series of cranked bends T', alternating in opposite directions, to which are pivoted the shanks U' of forks V'. The upper ends of the fork-shanks are held in position by links W', pivoted therein and connected by eyes W'' to the overhanging portion of the angle-bar O'. These forks are so disposed and connected that when the shaft R' thereof is revolved the motion at the ends of each fork is such that it will describe an ellipse the long diameter of which is at an inclination approximately parallel with the inclination of the apron D', over which the forks operate. By this construction it will be seen that the forks drop into the pea-vines beyond the cutting apparatus and gather them into the same to be severed. Said forks continuing their rearward movement will elevate the cut vines to the platform above and by a short upward turn withdraw therefrom. The vines at this point will be caught by the rakes and swept clear of the platform into bunches to the rear of the machine beyond the distances where they would interfere with the travel of the reaper.

Power may be communicated to the shaft

R' in any manner convenient to the construction of the machine to which my device is applied. In this instance, as shown, a sprocket Z' is fast to the outer end of the counter-shaft o, said sprocket being in link-belt connection with the sprocket S'' of the fork-driving shaft R'. By this arrangement of driving-gears the machine-frame may be adjusted up or down with relation to the bull-wheel without materially affecting the tension of the driving-chain of the fork mechanism.

It is obvious that my device may be attached to any form of reaper now in use and detached therefrom when said reaper is to be utilized for ordinary grain, &c., or said machine may be made up in its entirety.

I claim—

1. A reaping-machine comprising a vertically-adjustable platform, cam-controlled rakes supported by the platform, and a cutting apparatus in floating connection with the latter, in combination with an attachment comprising an apron in hinge connection with the floating cutting apparatus, and arranged at its free end to rest upon the reaper-platform, and a series of reciprocative forks carried by the platform and disposed above the apron, whereby the material cut is delivered to the aforesaid rakes.

2. A reaping-machine comprising a platform, cam-controlled rakes, and a floating cutting apparatus, in combination with an attachment comprising an apron in hinge connection with the cutting apparatus and arranged at its free end to rest upon the platform, a guard in hinge connection with the outer end of said cutting apparatus and reaper-platform, a series of reciprocative forks disposed above the apron and the aforesaid cutting apparatus, and driving means for the forks.

In testimony that I claim the foregoing I have hereunto set my hand, at New Holstein, in the county of Calumet and State of Wisconsin, in the presence of two witnesses.

FRITZ W. SCHMIDT.

Witnesses:
H. C. TIMM,
CHAS. RIENOW.